United States Patent Office 2,809,974
Patented Oct. 15, 1957

2,809,974

SUBSTITUTED-BENZ [CD] INDOLES AND THE PREPARATION THEREOF

Edmund C. Kornfeld, Indianapolis, Granville Bruce Kline, Greenwood, and Dwight E. Morrison, Indianapolis, Ind., assignors to Eli Lilly and Company, Indianapolis, Ind., a corporation of Indiana No Drawing. Application November 12, 1954, Serial No. 468,564

17 Claims. (Cl. 260—326.3)

This invention relates to novel organic compounds and more particularly to certain 4-substituted-amino-5-keto-benz[cd]indoles and to processes for their preparation, and to new intermediate compounds involved in the said processes.

Included within the scope of this invention are bases which can be represented by the formula

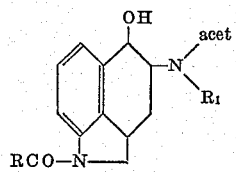

wherein R represents a member of the group consisting of alkyl radicals having from one to eight carbon atoms, monocarbocyclic aromatic, monocarbocyclic aromatic-substituted lower alkyl, and lower alkyl-substituted monocarbocyclic aromatic radicals, $R_1$ represents an alkyl radical having from one to eight carbon atoms, and acet represents a radical of the group consisting of

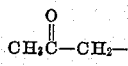

and

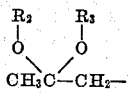

wherein $R_2$ and $R_3$ represent lower alkyl radicals, and when taken together $R_2$ and $R_3$ represent a polyalkylene chain having from two to three carbon atoms.

Broadly speaking, the substituted 5-hydroxy-polyhydrobenz[cd]indoles of the invention are prepared by the reaction of a selected 1-acyl-4,5-epoxy-1,2,2a,3,4,5-hexahydrobenz[cd] indole with the selected substituted amine. The following series of equations, in which R, $R_1$, $R_2$ and $R_3$ have the same significance as hereinabove, illustrates the preparation of 1-acyl-4-(N-alkyl-N-acetonyl)-amino-5-hydroxy-1,2,2a,3,4,5-hexadrobenz[cd] indoles, 1-acyl-5-hydroxy-4-(N-alkyl-N-acetonyl) - amino - 1,2,2a,3,4,5,-hexahydrobenz[cd]indole ketals, and 5 - keto-4-(N-alkyl-N-acetonyl)-amino - 1,2,2a,3,4,5 - hexahydrobenz[cd]indoles. The series thus serves to indicate the methods of preparing the intermediate compounds included within the scope of the invention, as well as processes for their conversion to compounds useful for the production of lysergic acid, as hereinafter disclosed.

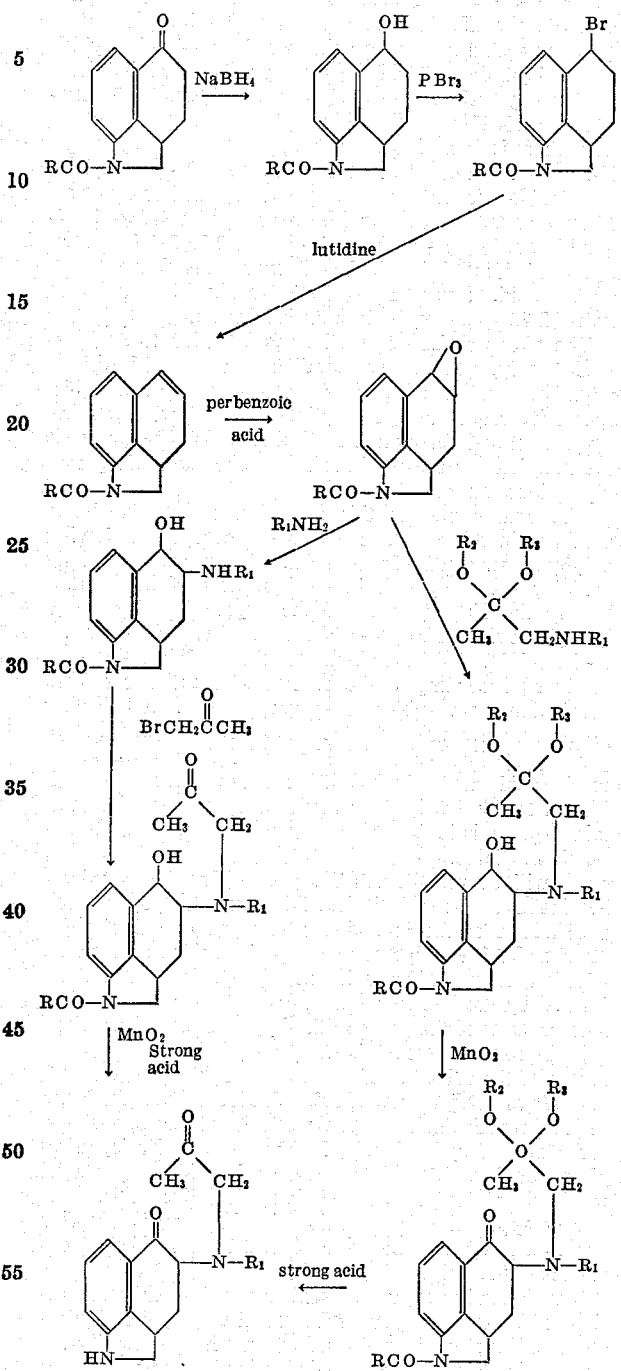

As will be seen from the formulae, an N-acyl-5-keto-1,-2,2a3,4,5-hexahydrobenz[cd]indole is treated with sodium borohydride to produce a 1-acyl-5-hydroxy-1,2,2a,3,4,5-hexahydrobenz[cd]indole, which upon reaction with phosphorous tribromide produces the corresponding 5-bromo compound. The bromo compound is refluxed with lutidine, yielding a 1-acyl-1,2,2a,3-tetrahydrobenz[cd] indole. Treatment of the tetrahydrobenz[cd]indole with perbenzoic acid produces the corresponding 4,5-epoxy-polyhydrobenz[cd]indole, which upon reaction with a monoalkylamine forms a 1 - acyl-4-alkylamino-5-hydroxy-1,2,2a,3,4,5-hexahydrobenz[cd]indole. By condensation of the acylated 4-alkylamino-5-hydroxypolyhydrobenz-

[cd]indole with bromoacetone, there is formed a 1-acyl-5-hydroxy-4-(N-alkyl-N - acetonyl)-amino - 1,2,2a,3,4,5-hexahydrobenz[cd]indole, which undergoes mild oxidation as by means of manganese dioxide to form a 1-acyl-5-keto - 4 - (N-alkyl-N-acetonyl) - amino-1,2,2a,3,4,5-hexahydrobenz[cd]indole (not shown) which is hydrolyzed by means of strong acid to a 5-keto-4-(N-alkyl-N-acetonyl)-amino-1,2,2a,3,4,5-hexahydrobenz[cd]indole.

Similarly, when a 1-acyl-4,5-epoxy-1,2,2a,3,4,5-hexahydrobenz[cd]indole is added to an alkylaminoacetone ketal there is formed the corresponding 1-acyl-4-(N-alkyl-N-acetonyl) - amino-5-hydroxy-1,2,2a,3,4,5 - hexahydrobenz[cd]indole ketal, which can be oxidized as by treatment with manganese dioxide to produce a 1-acyl-4-(N-alkyl-N-acetonyl) - amino - 5 - keto-1,2,2a,3,4,5-hexahydrobenz[cd]indole ketal. The latter, upon treatment with strong acid, forms a 4-(N-alkyl-N-acetonyl)-amino-5-keto-1,2,2a,3,4,5-hexahydrobenz[cd]indole.

The above series of reactions is intended to be illustrative only, and obvious modifications thereof will be apparent to those skilled in the art. Thus, for example, successive reaction steps may be combined wherever the by-products of reaction are eliminated in the course of the reaction, or are noninterfering with succeeding manipulations, and the like.

The compounds of this invention are useful intermediates in the synthesis of organic compounds having polyhydrobenz[cd]indole nuclei. They are especially useful for employment in the synthesis of compounds having the ring systems of the ergot alkaloids, e. g. lysergic acid. The 4 - (N-alkyl-N-acetonyl) - amino-5 - keto-1,2,2a,3,4,5-hexahydrobenz[cd]indoles which are produced according to the scheme of reaction set forth hereinabove are subjected to ring closure and further procedures according to the processes disclosed in copending application Serial No. 458,674 to produce lysergic acid, and N-alkyl homologues thereof. As is known to the art, lysergic acid can be converted to certain ergot alkaloids which are useful oxytocics in obstetric medicine.

As will be noted from the general formula set forth hereinabove, the substituted 5-hydroxy polyhydrobenz[cd]indoles of the invention contain an amino nitrogen atom which is capable of reacting with acids to form acid addition salts. Thus acid addition salts are readily formed by the interreaction of stoichiometrically equivalent amounts of the bases of the invention and the desired acid in mutual inert solvent solution, followed by removal of the solvent. Examples of acids which are suitable for the preparation of acid addition salts of the bases of the invention are inorganic or mineral acids, such as, for example, hydrochloric, hydrobromic, sulfuric, phosphoric acids and the like; and organic acids, e. g. acetic, propionic, maleic, benzoic, citric and the like acids.

This application is a continuation-in-part of our prior copending application Serial No. 332,094, filed January 19, 1953.

The following examples further illustrate the preparation and physical properties of the new polyhydrobenz[cd]indoles of the invention, and the process for the preparation of 5-keto-4-alkylaminoacetone-substituted polyhydrobenz[cd]indoles.

EXAMPLE 1

*1 - benzoyl - 4,5 - epoxy - 1,2,2a,3,4,5 - hexahydrobenz[cd]indole*

A mixture of 118 g. (0.4 mol) of N-benzoylindoline-3-propionic acid, prepared according to the method of Robinson, J. Chem. Soc. 1931, 3158, and 200 ml. of thionyl chloride was allowed to stand at room temperature for one half hour and thereafter was warmed on a steam bath for about twenty minutes. The excess thionyl chloride was evaporated in vacuo, and the residue comprising 1-benzoylindoline-3-propionyl chloride was dissolved in 200 ml. of dry carbon disulfide. The solution was added in a thin stream to a vigorously stirred suspension of 240 g. of aluminum chloride in 1750 ml. of carbon disulfide. The mixture was refluxed and stirred for one hour and treated with a mixture of 500 g. of ice, 250 ml. of concentrated hydrochloric acid, and 500 ml. of water. The mixture was stirred during the addition of the ice mixture and was cooled by intermittently distilling a portion of the carbon disulfide in vacuo. After addition of all of the ice mixture, the carbon disulfide remaining was distilled in vacuo and the aqueous residue was extracted with two liters of benzene. The benzene extract was dried over magnesium sulfate and evaporated in vacuo to a small volume. Several volumes of petroleum ether were added slowly to the concentrate whereupon a yellow crystalline precipitate of N-benzoyl-5-keto-1,2,2a,3,4,5-hexahydrobenz[cd]indole separated. The precipitate was filtered off, washed with petroleum ether, and recrystallized from benzene-petroleum ether mixture. After recrystallization from benzene-petroleum ether mixture, it melted at about 146–147° C.

A solution of 2.5 g. of sodium borohydride in 120 ml. of absolute ethanol was added dropwise to a stirred, refluxing solution of 25 g. of N-benzoyl-5-keto-1,2,2a,3,4,5-hexahydrobenz[cd]indole in 200 cc. of absolute ethanol during about one half hour. Refluxing was continued for about one hour, after which 50 ml. of 10 percent aqueous sodium hydroxide was added, and heating was continued for about one half hour. The solution was cooled and then poured into 350 ml. of 6N hydrochloric acid. The alcohol was removed by distillation in vacuo, yielding a precipitate of N-benzoyl-5-hydroxy-1,2,2a,3,4,5-hexahydrobenz[cd]indole. The precipitate was filtered off and dried in air. It melted at about 182–183° C.

A solution of 39.5 g. of N-benzoyl-5-hydroxy-1,2,2a,3,4,5-hexahydrobenz[cd]indole in 400 ml. of benzene was cooled in ice while 25 ml. of phosphorous tribromide was added slowly with stirring. The solution was allowed to stand overnight at room temperature and was then gently refluxed for four hours. The reaction mixture was thereafter cooled and poured over cracked ice. The resulting organic layer was removed, and the aqueous layer was washed with a mixture of equal parts of ether and benzene. The combined organic layer and washings were washed well with water and 5 percent sodium carbonate solution, and the organic solvents were evaporated in vacuo. A residue consisting of N-benzoyl-5-bromo-1,2,2a,3,4,5-hexahydrobenz[cd]indole was obtained. 36 g. of the 5-bromo-hexahydrobenz[cd]indole compound thus obtained were mixed with 150 ml. of 2,6-lutidine, and the solution was refluxed for about four hours. After cooling, the reaction mixture was poured into 400 ml. of ice-cold 6N hydrochloric acid. The mixture was extracted with three successive 200 ml. portions of 1:1 ether-benzene mixture. The combined extracts were washed with successive portions of aqueous sodium carbonate, dilute hydrochloric acid and water. The washed ether-benzene solution was then treated with active carbon, filtered, and the solvents removed by distillation in vacuo. A residue consisting of N-benzoyl-1,2,2a,3-tetrahydrobenz[cd]indole, was crystallized from a mixture of benzene and petroleum ether, yielding a product which melted at about 91–95° C. After recrystallization of the material the melting point was 95.5–96.5° C.

To 20 percent stoichiometric excess of a cold solution of perbenzoic acid in chloroform prepared in the usual manner and standardized against sodium thiosulfate, were added 24 g. of N-benzoyl-1,2,2a,3-tetrahydrobenz[cd]indole in small portions with thorough mixing. The solution was allowed to stand for forty-four hours at about 0° C. The solution was washed several times with five percent sodium hydroxide solution, followed with washing with water. The washed solution was dried over anhydrous sodium sulfate, and the chloroform was removed by distillation in vacuo. The residue, consisting of N- benzoyl - 4,5 - epoxy - 1,2,2a,3,4,5 - hexahydrobenz[cd]-indole, after crystallization from a mixture of ethyl acetate and petroleum ether, melted at about 95–100° C.

Other N-acyl-indoline-3-propionic acids can be employed in the procedure of this example to produce the corresponding acyl derivatives of 4,5-epoxy-polyhydrobenz[cd]indole. Thus there can be prepared the 1-propionyl-, 1-caproyl-, 1-n-heptanoyl-, 1-acetyl-, 1-phenylacetyl-, and 1-p-ethylbenzoyl-, and the like acyl derivatives of 1,2,2a,3-tetrahydrobenz[cd]indole. By treating these acyl derivatives with perbenzoic acid according to the above-mentioned procedure there are obtained, respectively, the 1-propionyl, 1-caproyl, 1-n-heptanoyl, 1-acetyl, 1-phenylacetyl, and 1-p-ethylbenzoyl-4,5-epoxy-hexahydrobenz[cd]indole.

EXAMPLE 2

*1 - benzoyl - 4 - methylamino - 5 - hydroxy - 1,2,2a,3,4,5-hexahydrobenz[cd]indole*

A mixture of 20 g. of 1-benzoyl-4,5-epoxy-1,2,2a,3,4,5-hexahydrobenz[cd]indole prepared according to the procedure of Example 1, and 200 ml. of liquid methylamine was placed in an autoclave and heated at 100° C. for about sixteen hours. The excess methylamine was removed by evaporation, and the residue was crystallized from benzene, filtered, washed with benzene and petroleum ether and dried. The 1 - benzoyl - 4 - methylamino - 5 - hydroxy - 1,2,2a,3,4,5 - hexahydrobenz[cd]indole thus prepared melted at about 93–95° C.

In place of 1 - benzoyl - 4,5 - epoxy - 1,2,2a,3,4,5 - hexahydrobenz[cd]indole there can be used the 1-propionyl-, 1-caproyl-, 1-heptanoyl-, 1-acetyl-, 1-phenylacetyl-, and 1 - p - ethylbenzoyl - 4,5 - epoxy - 1,2,2a,3,4,5 - hexahydrobenz[cd]indoles described in Example 1, to form the corresponding 1-propionyl-, 1-caproyl-, 1-heptanoyl-, 1-acetyl, 1-phenylacetyl-, and 1-p-ethylbenzoyl-4-methylamino - 5 - hydroxy - 1,2,2a,3,4,5 - hexahydrobenz[cd]-indoles, respectively.

In place of the methylamine used in the above procedure, other monoalkyl amines wherein the alkyl group has from one to eight carbon atoms can be employed. Thus, for example, ethylamine, isopropylamine, n-butylamine and n-heptylamine can be employed to produce the corresponding 1 - benzoyl - 4 - ethylamino - 5 - hydroxy-1,2,2a,3,4,5 - hexahydrobenz[cd]indole, 1 - benzoyl - 4 - isopropylamino - 5 - hydroxy - 1,2,2a,3,4,5 - hexahydrobenz[cd]indole, 1 - benzoyl - 4 - n - butylamino - 5 - hydroxy - 1,2,2a,3,4,5 - hexahydrobenz[cd]indole and 1 - benzoyl - 4 - n - heptylamino - 5 - hydroxy - 1,2,2a,3,4,5 - hexahydrobenz[cd]indole, respectively.

EXAMPLE 3

*Preparation of methylaminoacetone ethylene ketal*

A mixture of 1200 ml. of liquid methylamine and 300 g. of chloroacetone, ethylene ketal was heated in a high pressure autoclave at 160–165° C. for about twenty-five hours. The reaction mixture was cooled and the excess methylamine was evaporated. The residue, comprising methylaminoacetone ethylene ketal, was dissolved in several volumes of ether. The ether solution was mixed with a solution of 130 g. of potassium hydroxide in 65 ml. of water, and was decanted from the sludge. The ethereal extract containing methylaminoacetone ethylene ketal formed in the reaction was dried over solid potassium hydroxide, the ether was removed by evaporation, and the residue was distilled. The portion boiling at 158–161° C. was collected, was dissolved in two liters of dry ether, and dry hydrogen chloride gas was passed into the solution until precipitation of the hydrochloric acid addition salt of the base was complete. The methylaminoacetone ethylene ketal hydrochloride thus prepared melted at about 165–167° C. It can be represented by the formula

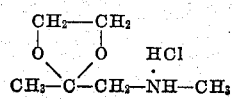

The methylaminoacetone ethylene ketal hydrochloride was suspended in one liter of dry ether, and to the mixture was added with stirring a solution of 110 g. of potassium hydroxide in 55 ml. of water. Sufficient excess solid potassium hydroxide was added to remove all water, and the organic layer was decanted, and the ether was evaporated. The residue was distilled yielding methylaminoacetone ethylene ketal which boiled at about 158–159° C.

In the place of the methylamine used above, other amines having from two to eight carbon atoms can be used in the process. Thus, by employing ethylamine, isopropylamine, butylamine and n-heptylamine in the process of this example the corresponding ethylaminoacetone ethylene ketal, isopropylaminoacetone ethylene ketal, butylaminoacetone ethylene ketal and n-heptylaminoacetone ethylene ketal, respectively, are produced. Similarly, other ketals, such as chloroacetone propylene ketal, can be employed to produce the corresponding aminoacetone ketals, as for example, methylaminoacetone propylene ketal. The aminoacetone ketals described are suitable for use in the process of the invention as exemplified by the following example. Likewise, aminoacetone dialkyl ketals, wherein the amino group can be substituted with an alkyl radical having from one to eight carbon atoms, such as methylaminoacetone diethyl ketal, isopropylaminoacetone diethyl ketal, amylaminoacetone diethyl ketal, n-heptylaminoacetone dipropyl ketal and the like, can be used in the procedure of the following examples to produce the corresponding 1-benzoyl-5-hydroxy-4-(N-alkyl-N-acetonyl)-amino-1,2,2a,3,4,-5-hexahydrobenz[cd]indole dialkyl ketals.

EXAMPLE 4

*1-benzoyl-4-(N-methyl-N-acetonyl)-amino-5-hydoxy-1,2,-2a,3,4,5-hexahydrobenz[cd]indole ethylene ketal hydrochloride*

A mixture of about 2.47 g. (0.01 mol) of 1-benzoyl-4,5-epoxy-1,2,2a,3,4,5-hexahydrobenz[cd]indole and 5.0 g. of methylaminoacetone ethylene ketal was warmed on a steam bath for about nineteen hours. The excess amount of the ketal was removed by distillation in vacuo, and the residue was dissolved in about 20 ml. of benzene. Petroleum ether was added to the benzene solution until precipitation was completed, and the solvents were removed from the resulting gum by decantation. The residue, comprising 1-benzoyl-4-(N-methyl-N-acetonyl)-amino-5-hydroxy - 1,2,2a,3,4,5-hexahydrobenz[cd]indole ethylene ketal, was dissolved in about 10 ml. of acetone, and dry hydrogen chloride was passed into the solution. A crystalline precipitate of 1-benzoyl-4-(N-methyl-N-acetonyl)-amino-5-hydroxy-1,2,2a,3,4,5-hexahydrobenz[cd]indole ethylene ketal hydrochloride was formed, which was removed by filtration, and washed with cold acetone and ether. It melted with decomposition at about 156–158° C.

1-benzoyl-4-(N-methyl-N-acetonyl) - amino-5-hydroxy-1,2,2a,3,4,5-hexahydrobenz[cd]indole ethylene ketal hydrochloride can be represented by the formula

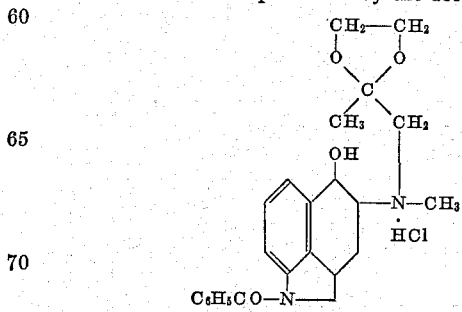

By employing other substituted alkylaminoacetone ketals as disclosed in Example 3, the corresponding 1-benzoyl-5-hydroxy-4-(N-ethyl-N-acetonyl)-amino-1,2,2a,3,4,-

5-hexahydrobenz[cd]indole ethylene ketal, 1-benzoyl-5-hydroxy-4-(N-butyl-N-acetonyl)-amino-1,2,2a,3,4,5-hexahydrobenz[cd]indole ethylene ketal, 1 - benzoyl - 5 - hydroxy - 4 - (N-n-heptyl-N-acetonyl) - amino - 1,2,2a,3,4,5-hexahydrobenz[cd]indole ethylene ketal, 1-benzoyl-5-hydroxy-4-(N-methyl-N-acetonyl)-amino-1,2,2a,3,4,5-hexahydrobenz[cd]indole propylene ketal, 1 - benzoyl-5-hydroxy-4-(N - isopropyl-N-acetonyl) - amino - 1,2,2a,3,4,5-hexahydrobenz[cd]indole diethyl ketal and 1-benzoyl-5-hydroxy-4-(N-amyl-N-acetonyl)-amino-1,2,2a,3,4,5-hexahydrobenz[cd]indole dipropyl ketal are obtained. These substances are also converted to their acid addition salts in the same manner as described hereinabove. Alternatively, acid addition salts of the above-named bases can be prepared by dissolving the desired base in a minimum quantity of a solvent such as ethanol, adding thereto the equivalent amount of the desired acid, and evaporating the reaction mixture to dryness in vacuo. Thus, by the use of sulfuric, phosphoric, acetic, maleic and the like acids there are obtained, respectively, the sulfate, phosphate, acetate and maleate salts of the said bases.

The temperature at which the condensation described hereinabove is carried out can be varied over a range of from about 50° to about 150° C. Generally speaking, the reaction is more rapid at the higher temperatures.

Inert organic solvents can be used, such as toluene, xylene and the like.

EXAMPLE 5

*Preparation of 1-acetyl-4-(N-methyl-N-acetonyl)-amino-5-hydroxy-1,2,2a,3,4,5-hexahydrobenz[cd]indole ethylene ketal*

N-acetylindoline-3-propionic acid was prepared by the reduction and acetylation of indole-3-propionic acid. A mixture of 23.3 g. (0.1 mol) of N-acetylindoline-3-propionic acid and 50 ml. of pure thionyl chloride was allowed to stand for one half hour at room temperature and thereafter was warmed for about twenty minutes on a steam bath. The excess of thionyl chloride was removed by evaporation in vacuo. The residue was dissolved in 50 ml. of dry nitrobenzene, and the nitrobenzene solution was added in a thin stream to a vigorously stirred suspension of 60 g. of anhydrous aluminum chloride in 150 ml. of nitrobenzene, the reaction mixture being cooled externally to maintain the reaction temperature at about 10° to 20° C. The mixture was then stirred and heated at 50° C. for about three hours and allowed to stand at room temperature for a few hours. The reaction mixture was cooled to 20° C., and decomposed by the slow addition of a mixture of 100 g. of crushed ice, 100 ml. of concentrated hydrochloric acid, and 200 ml. of water. The lower nitrobenzene layer was separated and washed with three 150 ml. portions of 2N sodium hydroxide solution, and then with water. The washed nitrobenzene layer was separated and steam distilled to remove the nitrobenzene. The aqueous residue, which contained a precipitate of N-acetyl-5-keto-1,2,2a,3,4,5-hexahydrobenz[cd]indole, was filtered, and the precipitate was washed with water and dried. The dry material melted at about 174.5–176.5° C.

The procedure of Example 1 is repeated, using 1-acetyl-5-keto-1,2,2a,3,4,5-hexahydrobenz[cd]indole instead of the corresponding 1-benzoyl derivative, whereby 1-acetyl-4,5-epoxy-1,2,2a,3,4,5-hexahydrobenz[cd]indole is formed. The 1-acetyl-4,5-epoxy-1,2,2a,3,4,5-hexahydrobenz[cd]indole is treated with methylaminoacetone ethylene ketal following the procedure of Example 4, whereupon 1 - acetyl - 4 - (N - methyl - N - acetonyl) - amino - 5 - hydroxy - 1,2,2a,3,4,5 - hexahydrobenz[cd]indole ethylene ketal hydrochloride is formed. The salt is dissolved in dilute aqueous sodium hydroxide solution and the 1 - acetyl - 4 - (N - methyl - N - acetonyl) - amino - 5 - hydroxy - 1,2,2a,3,4,5 - hexahydrobenz[cd]indole ethylene ketal is extracted with benzene. Removal of the solvent and recrystallization from acetone-ether furnishes the pure base.

1 - acetyl - 4 - (N - methyl - N - acetonyl) - amino - 5 - hydroxy - 1,2,2a,3,4,5 - hexahydrobenz[cd]indole ethylene ketal melted at about 152–153° C.

By using other 1-acyl-5-keto-1,2,2a,3,4,5-hexahydrobenz[cd]indoles as described in Example 1 in the procedure of this example, there are obtained the corresponding 1 - propionyl - 5 - hydroxy - 4 - (N - methyl - N - acetonyl) - amino - 1,2,2a,3,4,5 - hexahydrobenz[cd]indole ethylene ketal, 1 - caproyl - 5 - hydroxy - 4 - (N - methyl - N - acetonyl) - amino - 1,2,2a,3,4,5 - hexahydrobenz[cd]indole ethylene ketal, 1 - n - heptanoyl - 5 - hydroxy - 4 - (N - methyl - N - acetonyl) - amino - 1,2,2a,3,4,5 - hexahydrobenz[cd]indole ethylene ketal, 1 - phenylacetyl - 4 - (N - methyl - N - acetonyl) - amino - 5 - hydroxy - 1,2,2a,3,4,5 - hexahydrobenz[cd]indole ethylene ketal and 1 - p - ethylbenzoyl - 4 - (N - methyl - N - acetonyl) - amino - 5 - hydroxy - 1,2,2a,3,4,5 - hexahydrobenz[cd]indole ethylene ketal. The acid addition salts of these acylated alkylaminoacetone-substituted 5-hydroxypolyhydrobenz[cd]indole ketals are prepared according to the manner previously described herein.

EXAMPLE 6

*Preparation of 1-benzoyl-5-hydroxy-4-(N-methyl-N-acetonyl)-amino-1,2,2a,3,4,5-hexahydrobenz[cd]indole*

A mixture of 3.17 g. (0.11 mol) of 1 - benzoyl - 5 - hydroxy - 4 - methylamino - 1,2,2a,3,4,5 - hexahydrobenz[cd]indole and 0.56 g. (0.05 mol) of bromoacetone in 25 ml. of benzene is warmed on a steam bath under reflux for about one hour. The supernatant liquid is decanted from a precipitate of the hydrobromide salt of the excess 4-methylamino-polyhydrobenz[cd]indole which has separated, and the precipitate is washed with benzene. The combined benzene solutions are washed with water and aqueous sodium bicarbonate. The washed benzene solution is dried over magnesium sulfate, the benzene is removed by distillation. The residue is dissolved in 6 ml. of methanol and 30 ml. of ether, and 1.5 ml. of acetic anhydride are added thereto, to acetylate any unchanged starting material. The mixture is kept at about 25° for sixteen hours, after which the solvents are evaporated and the residue is dissolved in chloroform. The basic product is separated from the neutral acetylated starting material by extraction with dilute hydrochloric acid. The aqueous acid extracts are neutralized with sodium bicarbonate, and the neutral aqueous mixture is extracted with chloroform. The chloroform is evaporated, leaving as a residue the 1 - benzoyl - 5 - hydroxy - 4 - (N - methyl - N - acetonyl) - amino - 1,2,2a,3,4,5 - hexahydrobenz[cd]indole, which melts at about 158–160° C. after recrystallization from aqueous acetone.

By dissolving the 1-benzoyl-5-hydroxy-4-(N-methyl-N-acetonyl)-amino-1,2,2a,3,4,5-hexahydrobenz[cd]indole obtained by the above procedure in 25 ml. of ethanol, and passing dry hydrogen chloride through the solution until saturated, followed by evaporation of the ethanol, there is obtained the hydrochloric acid addition salt of 1 - benzoyl - 5 - hydroxy - 4 - (N - methyl - N - acetonyl) - amino - 1,2,2a,3,4,5 - hexahydrobenz[cd]indole, melting at about 230–232° C. after recrystallization from methanol-ether solution.

In place of the 1-benzoyl-5-hydroxy-4-methylamino-1,2,2a,3,4,5-hexahydrobenz[cd]indole used in the above procedure, the various 1-acylated and 4-alkylamino-substituted polyhydrobenz[cd]indoles described in Example 2 can be used in the process. There can be obtained in this way 1 - propionyl - 5 - hydroxy - 4 - (N - ethyl - N - acetonyl) - amino - 1,2,2a,3,4,5 - hexahydrobenz[cd]indole, 1 - acetyl - 5 - hydroxy - 4 - (N - isopropyl - N - acetonyl) - amino - 1,2,2a,3,4,5 - hexahydrobenz[cd]indole, 1 - heptanoyl - 5 - hydroxy - 4 - (N - n - heptyl - N - acetonyl) - 1,2,2a,3,4,5 - hexahydrobenz[cd]indole, 1 - phenylacetyl - 5 - hydroxy - 4 - (N - methyl - N - acetonyl) - amino - 1,2,2a,3,4,5 - hexahydrobenz[cd]indole, and 1 - p - ethylbenzoyl - 4 - (N - *n* - butyl - N - acetonyl) - amino - 1,2,2a,3,4,5 - hexahydrobenz[cd]indole.

Other halo acetones, for example, chloroacetone, can be employed in the preparation of the compounds of this example. Acid addition salts can be prepared from the bases by methods known to the art, as for example by treating an alcohol solution of the selected base with the desired acid in equivalent amount, and evaporating the alcohol to obtain a residue which consists of the desired acid addition salts. In this way there can be obtained the hydrobromic, acetic, propionic, sulfuric, phosphoric and maleic acid salts of the above-named bases.

EXAMPLE 7

*Preparation of 1 - benzoyl - 5 - keto - 4 - (N - methyl - N - acetonyl) - amino - 1,2,2a,3,4,5 - hexahydrobenz[cd]indole*

To a solution of 3 g. of 1 - benzoyl - 5 - hydroxy - 4 - (N - methyl - N - acetonyl) - amino - 1,2,2a,3,4,5 - hexahydrobenz[cd]indole in 50 ml. of chloroform are added 20 g. of powdered manganese dioxide. The reaction mixture is held at room temperature for about six hours, with stirring. The manganese dioxide is then removed by filtration, and the reaction mixture is evaporated in vacuo to remove the solvent. The residue, comprising 1 - benzoyl - 5 - keto - 4 - (N - methyl - N - acetonyl) - amino - 1,2,2a,-3,4,5 - hexahydrobenz[cd]indole, is crystallized from the minimum amount of warm methanol. The diketo compound thus prepared melts at about 110–112° C.

A solution of 2 g. of 1-benzoyl-5-keto-4-(N-methyl-N-acetonyl)-amino-1,2,2a,3,4,5-hexahydrobenz[cd]indole in a mixture of 25 ml. of concentrated HCl and 25 ml. of water is kept under an atmosphere of nitrogen at room temperature for about six days. The mixture is treated with decolorizing carbon, filtered and concentrated to about 10 ml. in vacuo. The filtrate is made alkaline with sodium bicarbonate and is then extracted with chloroform. The chloroform extract is evaporated to dryness and the residue is crystallized from a mixture of benzene and ether. There is obtained 5-keto-4-(N-methyl - N - acetonyl)-amino-1,2,2a,3,4,5-hexahydrobenz[cd]indole, melting at about 109–110° C.

Instead of manganese dioxide, other mild oxidizing agents can be employed in the process of this example. Likewise, other nonpolar organic solvents can be used, such as carbon tetrachloride, benzene and the like. To avoid formation of undesirable by-products, the oxidation is preferably carried out at a moderate temperature in the range of about 10–50° C. although a higher temperature may be used. To accomplish the hydrolysis, other strong, nonoxidizing mineral acids can be used, such as phosphoric acid and the like.

Similarly, the various 1-acyl-4-alkylacetonylamino polyhydrobenz[cd]indoles described in Example 6 are employed in the procedure of this example, whereupon the corresponding 1-acyl-5-keto-4-alkylacetonylamino polyhydrobenz[cd]indoles are produced. When treated with strong mineral acid according to the procedure described above, there are obtained the corresponding 5-keto-4-alkylacetonylamino polyhydrobenz[cd]indoles.

EXAMPLE 8

*Preparation of 1-benzoyl-4-(N-methyl-N-acetonyl)-amino-5-keto-1,2,2a,3,4,5-hexahydrobenz[cd]indole ethylene ketal*

To a solution of 1.2 g. of 1-benzoyl-5-hydroxy-4-(N-methyl - N - acetonyl)-amino-5-hydroxy-1,2,2a,3,4,5-hexahydrobenz[cd]indole ethylene ketal, prepared according to the procedure of Example 4, in 30 ml. of chloroform are added 10 g. of powdered manganese dioxide. The mixture is kept at room temperature, with stirring, for about thirty-six hours. The reaction mixture is filtered and the filtrate is evaporated in vacuo. The residue, consisting of 1-benzoyl-5-keto-4-(N-methyl-N-acetonyl)- amino-1,2,2a,3,4,5-hexahydrobenz[cd]indole ethylene ketal, is crystallized from warm methanol, and melts at about 135–136° C.

In carrying out the oxidation procedure of this example, other mild oxidizing agents can be used.

Other acylated 5-hydroxy polyhydrobenz[cd]indole ketals, such as those disclosed in Examples 4 and 5, can be employed in the procedure of this reaction to produce the corresponding 5-keto-polyhydrobenz[cd]indole ketals. Thus, there are produced 1-benzoyl-5-keto-4-(N-ethyl-N-acetonyl) - amino - 1,2,2a,3,4,5-hexahydrobenz[cd]indole ethylene ketal, 1-benzoyl-5-keto-4-(N-butyl-N-acetonyl)-amino-1,2,2a,3,4,5-hexahydrobenz[cd]indole ethylene ketal, 1-acetyl-5-hydroxy-4-(N-methyl-N-acetonyl)-amino-1,2,2a,3,4,5-hexahydrobenz[cd]indole ethylene ketal, and the like.

EXAMPLE 9

*Preparation of 5-keto-4-(N-methyl-N-acetonyl)-amino-1,2,2a,3,4,5-hexahydrobenz[cd]indole*

A solution of 2 g. of N-benzoyl-5-keto-4-(N-methyl-N-acetonyl) - amino - 1,2,2a,3,4,5-hexahydrobenz[cd]indole ethylene ketal hydrochloride in a mixture of 25 ml. of concentrated hydrochloric acid and 25 ml. of water was kept under an atmosphere of nitrogen at a temperature of about 35° C. for about five days. The mixture was then cooled, treated with decolorizing carbon and filtered. The filtrate was concentrated to small volume in vacuo and the residue was made alkaline with an excess of sodium bicarbonate. The alkaline residue was extracted with chloroform, the chloroform extracts were evaporated to dryness in vacuo and the resulting dry residue was collected, powdered and slurried with a mixture of equal parts of benzene and ether. The solvent mixture was removed by filtration, leaving as a residue crystalline 5 - keto - 4 - (N-methyl-N-acetonyl)-amino-1,2,2a,3,4,5-hexahydrobenz[cd]indole which after recrystallization from a mixture of benzene and ether melted at about 109–110° C.

We claim:

1. In the process of preparing 5-keto-4-alkylaminoacetone-substituted polyhydrobenz[cd]indoles, the step which comprises heating together an amine having the formula $R_1NH_2$ wherein $R_1$ represents an alkyl radical having from one to eight carbon atoms, and an epoxy polyhydrobenz[cd]indole represented by the formula

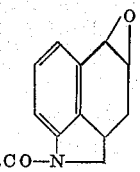

wherein R represents a member of the group consisting of alkyl radicals having from one to eight carbon atoms, monocarbocyclic aromatic, monocarbocylic aromatic-substituted lower alkyl, and lower alkyl-substituted monocarbocyclic aromatic radicals, to form a 4-alkyl-amino-5-hydroxy-polyhydrobenz[cd]indole.

2. The process according to claim 1, wherein the amine is methylamine.

3. In the process of preparing a 5-keto-4-alkyl-acetonylamino-substituted polyhydrobenz[cd]indole, the step which comprises condensing a haloacetone with an alkylamino-substituted 5-hydroxy-polyhydrobenz[cd]-indole represented by the formula

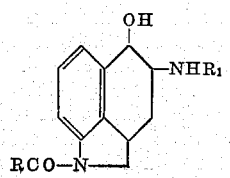

wherein R represents a member of the group consisting of alkyl radicals having from one to eight carbon atoms, monocarbocyclic aromatic, monocarbocyclic aromatic-substituted lower alkyl and lower alkyl-substituted monocarbocyclic aromatic radicals; and $R_1$ represents an alkyl radical having from one to eight carbon atoms, to produce the corresponding 5-hydroxy-4-alkylacetonylamino-substituted polyhydrobenz[cd]indole.

4. The process according to claim 3, wherein the 5-hydroxy-4-alkylamino polyhydrobenz[cd]indole is 1-benzoyl - 5 - hydroxy-4-methylamino-1,2,2a,3,4,5-hexahydrobenz[cd]indole.

5. In the process of preparing a 5-keto-4-alkylacetonylamino-substituted polyhydrobenz[cd]indole, the step which comprises oxidizing with a mild oxidizing agent and at a temperature in the range of about 10–50° C. a 5-hydroxy-4-alkylacetonylamino-substituted polyhydrobenz[cd]indole represented by the formula

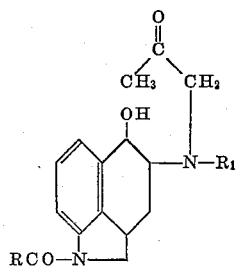

wherein R represents a member of the group consisting of alkyl radicals having from one to eight carbon atoms, monocarbocyclic aromatic, monocarbocyclic aromatic-substituted lower alkyl, and lower alkyl-substituted monocarbocyclic aromatic radicals; and $R_1$ represents an alkyl radical having from one to eight carbon atoms.

6. The process according to claim 5, wherein the 5-hydroxy-4-alkylacetonylamino-substituted polyhydrobenz[cd]indole is 1-benzoyl-5-hydroxy-4-(N-methyl-N-acetonyl)-amino-1,2,2a,3,4,5-hexahydrobenz[cd]indole.

7. In the process of preparing a 5-keto-4-alkylacetonylamino - substituted polyhydrobenz[cd]indole, the step which comprises heating together a 4,5-epoxy polyhydrobenz[cd]indole represented by the formula

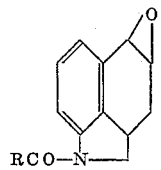

wherein R represents a member of the group consisting of alkyl radicals having from one to eight carbon atoms, monocarbocyclic aromatic, monocarbocyclic aromatic-substituted lower alkyl and lower alkyl-substituted monocarbocyclic aromatic radicals with a ketal represented by the formula

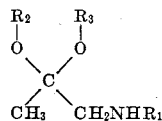

wherein $R_1$ represents an alkyl radical having from one to eight carbon atoms, $R_2$ and $R_3$ represent lower alkyl radicals, and $R_2$ and $R_3$ taken together represent a polyalkylene chain having from two to three carbon atoms, to produce the corresponding 5-hydroxy-4-alkylacetonylamino polyhydrobenz[cd]indole ketal.

8. The process according to claim 7, wherein the 4,5 - epoxy polyhydrobenz[cd]indole is 1 - benzoyl - 4,5-epoxy - 1,2,2a,3,4,5-hexahydrobenz[cd]indole.

9. The process according to claim 7, wherein the ketal is methylaminoacetone ethylene ketal.

10. In the process of preparing a 5-keto-4-alkylacetonylamino - substituted polyhydrobenz[cd]indole, the step which comprises oxidizing with a mild oxidizing agent and at a temperature in the range of about 10–50° C. a substituted polyhydrobenz[cd]indole represented by the formula

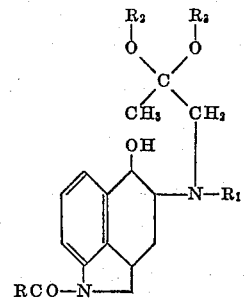

wherein R represents a radical of the group consisting of alkyl radicals having from one to eight carbon atoms, monocarbocyclic aromatic, monocarbocyclic aromatic-substituted lower alkyl radicals and lower alkyl substituted monocarbocyclic aromatic radicals, $R_1$ represents an alkyl radical having from one to eight carbon atoms, $R_2$ and $R_3$ represent lower alkyl radicals, and $R_2$ and $R_3$ taken together represent a polyalkylene chain having from two to three carbon atoms.

11. The process step according to claim 10, wherein the polyhydrobenz[cd]indole is represented by the formula

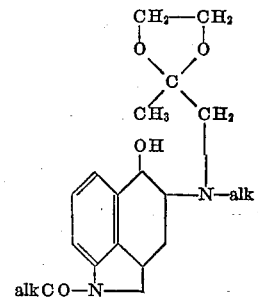

wherein alk represents a lower alkyl radical.

12. The process step according to claim 10, wherein the polyhydrobenz[cd]indole is 1-benzoyl-4-(N-methyl-N - acetonyl) - amino - 5 - hydroxy - 1,2,2a,3,4,5 - hexahydrobenz[cd]indole ethylene ketal.

13. A compound of the group consisting of bases represented by the formula

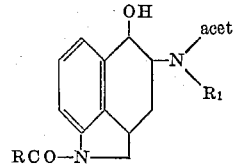

wherein R represents a member of the group consisting of alkyl radicals having from one to eight carbon atoms, monocarbocyclic aromatic, monocarbocyclic aromatic-substituted lower alkyl and lower alkyl-substituted monocarbocyclic aromatic radicals, $R_1$ represents a member of the group consisting of alkyl radicals having from one to eight carbon atoms, and acet represents a radical of the group consisting of $$CH_3-\overset{\overset{\displaystyle O}{\|}}{C}-CH_2-$$

and

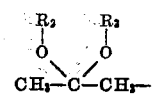

wherein $R_2$ and $R_3$ represent lower alkyl radicals, and when taken together $R_2$ and $R_3$ represent a polyalkylene chain having from two to three carbon atoms.

14. 1 - benzoyl - 5 - hydroxy - 4 - (N - methyl - N-acetonyl) - amino - 1,2,2a,3,4,5 - hexahydrobenz[cd]indole.

15. 1 - benzoyl - 5 - hydroxy - 4 - (N - methyl - N-acetonyl) - amino - 1,2,2a,3,4,5 - hexahydrobenz[cd]indole ethylene ketal.

16. 1 - acetyl - 5 - hydroxy - 4 - (N - methyl - N - acetonyl) -amino - 1,2,2a,3,4,5 - hexahydrobenz[cd]indole ethylene ketal.

17. A compound of the group consisting of bases represented by the formula

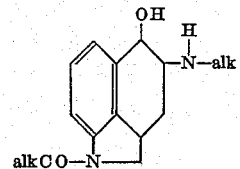

wherein alk represents a lower alkyl radical.

References Cited in the file of this patent
FOREIGN PATENTS

| | | | |
|---|---|---|---|
| 702,768 | Great Britain | | Jan. 20, 1954 |
| 745,495 | Great Britain | | Feb. 29, 1956 |
| 302,151 | Switzerland | | Dec. 16, 1954 |